US005191503A

United States Patent [19]

Kawamura et al.

[11] Patent Number: 5,191,503

[45] Date of Patent: Mar. 2, 1993

[54] LIGHTNING SURGE PROTECTOR

[75] Inventors: Takeshi Kawamura; Isao Harada; Tomohisa Matsushita, all of Osaka, Japan

[73] Assignee: Sumitomo Electric Industries, Ltd., Osaka, Japan

[21] Appl. No.: 679,188

[22] Filed: Apr. 2, 1991

[30] Foreign Application Priority Data

Apr. 2, 1990 [JP] Japan .................................. 2-88823
Oct. 15, 1990 [JP] Japan .................................. 2-276631

[51] Int. Cl.[5] .............................................. H02H 1/00
[52] U.S. Cl. ...................................... 361/127; 361/40; 174/2; 337/28
[58] Field of Search .................. 361/127, 14, 40, 129, 361/130, 126; 174/2; 313/325, 326; 337/28, 34

[56] References Cited

U.S. PATENT DOCUMENTS 4,493,003 1/1985 Mickelson et al. ............ 361/129 X
4,910,632 3/1990 Shiga et al. ........................ 361/127

FOREIGN PATENT DOCUMENTS 60-70702 4/1985 Japan .
61-151913 7/1986 Japan .

*Primary Examiner*—Steven L. Stephan
*Attorney, Agent, or Firm*—Cushman, Darby & Cushman

[57] ABSTRACT

A lightning surge protector, comprises a current limiting element in a pressure-proof housing. The pressure-proof housing is composed of a conductive material and coupled with an upper electrode member. Also, a self arc-extinguishing LSP comprises a current limiting element and upper and lower electrode members housed and fixed in a conductive pressure-proof housing opened at its lower portion through a suspension structure composed of a suspension rod. The outside and inside of the housing are covered and filled with an insulator, so that, upon occurrence of an internal arc due to a short-circuit fault or the like, the energy due to the arc causes the lower electrode member to break the insulator in the vicinity of an opening portion of the conductive pressure-proof housing so as to electrically connect the conductive pressure-proof housing to a part of the lower electrode member.

8 Claims, 7 Drawing Sheets

Fig. 10A.
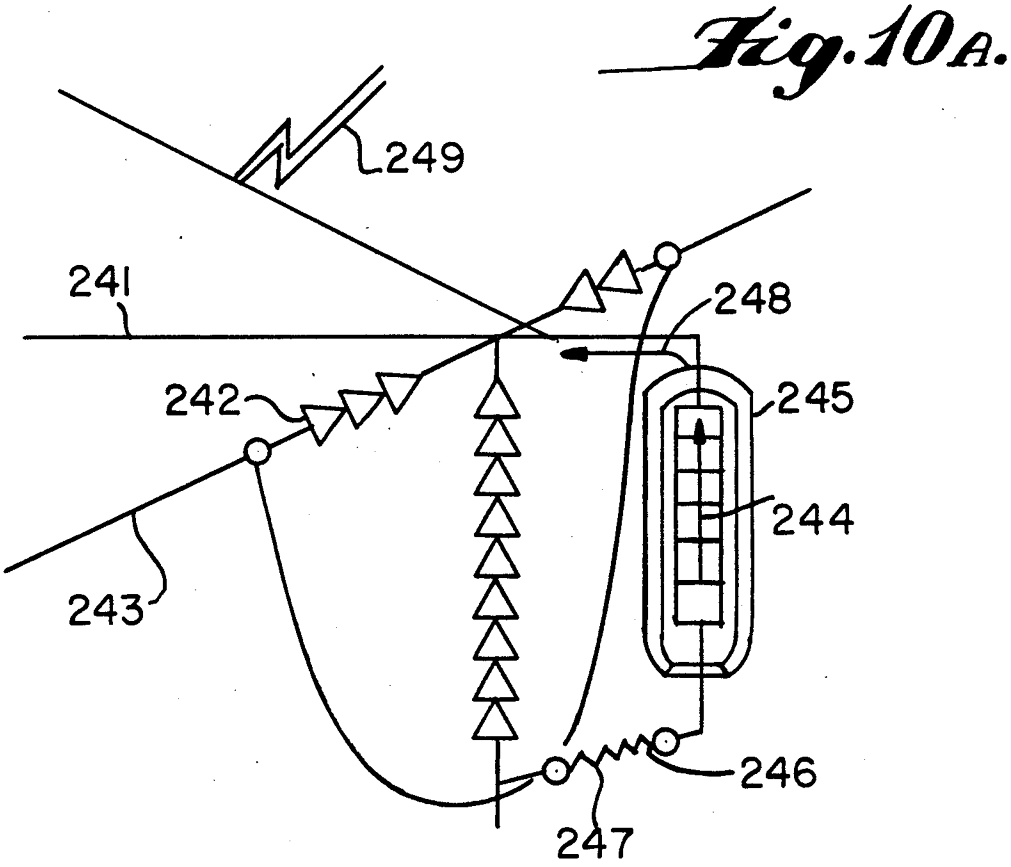
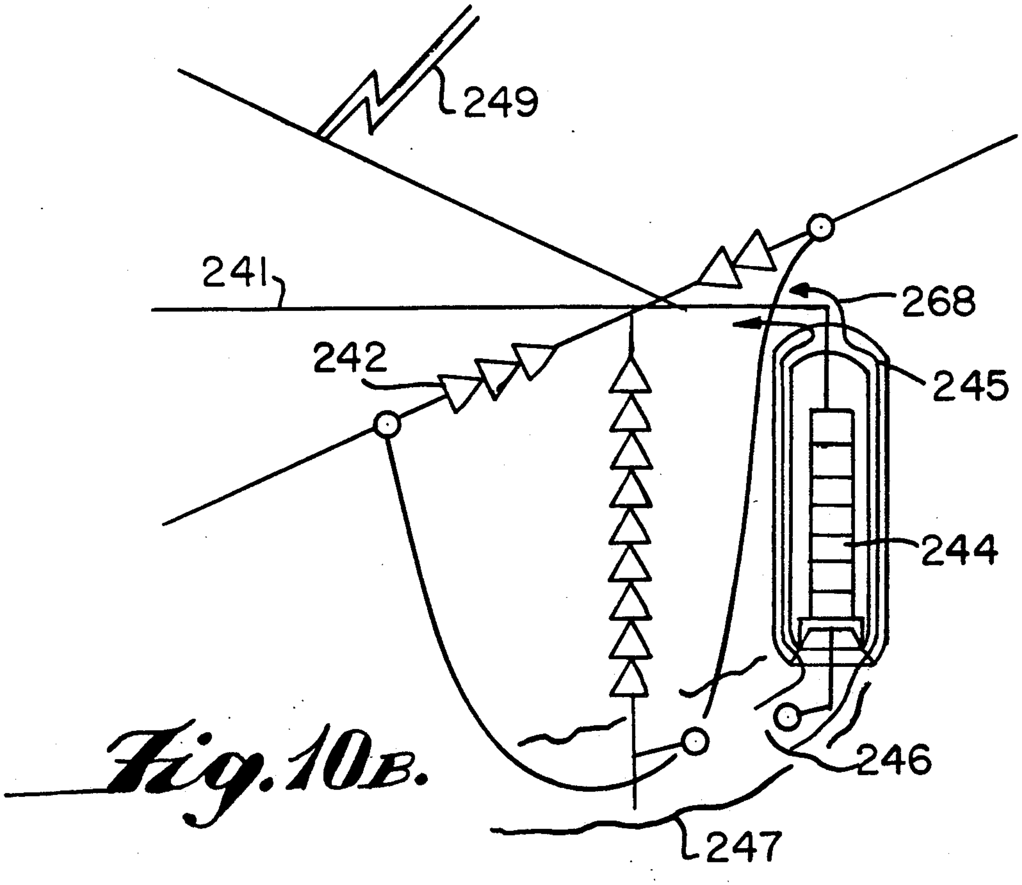
Fig. 10B.

LIGHTNING SURGE PROTECTOR

BACKGROUND OF THE INVENTION

The present invention relates to a lightning surge protector (LSP) for protecting power transmission/distribution equipment from an abnormal voltage caused by a lightning surge.

FIGS. 1 and 2 are longitudinal sectional views each illustrating a basic structure of the conventional LSP having a non-linear resistive current limiting element (hereinafter simply referred to as "current limiting element").

The LSP shown in FIG. 1 comprises electrode members such as an upper electrode plate 103, a lower electrode plate 104 and a spring 109 which are housed and fixed in an inner space defined by a cylindrical pressure-proof insulating housing 111 such as FRP. An upper electrode metal member 105 and a lower electrode metal member 106 are coupled with the upper and lower ends of the housing by means of screws. The outer wall surface of the pressure-proof housing 111 is covered with an insulating coating 107 of an organic insulating material. The inner space of the housing is filled with an organic insulating material 108.

The LSP shown in FIG. 2 is similar to the above-mentioned LSP, only the pressure-proof insulating housing 111 is replaced by an insulator 112, and electrode members such as the upper electrode plate 103, the lower electrode plate 104 and the spring 109 are housed and fixed in the inner space defined by the insulator 112. Also, the upper electrode metal member 105 and the lower electrode metal member 106 are coupled with the upper and lower ends of the housing by means of screws, and the inner space portion is filled with an insulating gas 113.

A pressure-release structure is provided in each of these basic structures as a counter-measure for safety in the case of a failure of the surge protecting device.

Furthermore, LSPs having a current limiting element are disclosed in Japanese Unexamined Patent Publication Nos. Sho-61-151913 and Sho-60-70702.

FIG. 3 is a longitudinal sectional view illustrating an LSP of the former Publication, comprising an arcing ring 226 attached to a structure in which a current limiting element 222 is housed in a pressure-proof insulating cylinder 221. The insulating cylinder has pressure-release holes 224 formed in its side surface, and the outside and inside of the pressure-proof insulating cylinder 221 are covered and filled with an insulating material 223. The reference numeral 225 designates an electrode.

FIG. 4 is a longitudinal sectional view illustrating an LSP of the latter Publication, in which a current limiting element 232 is housed in a pressure-proof insulating cylinder 231. Pressure-release valves 233 and pressure-release openings 234 are provided in each of the upper and lower portions of the cylinder 231.

In each of the above-mentioned conventional LSPs, in the case of an ordinary lightning surge, the surge is passed by the current limiting element and the insulating state is recovered in the condition of a transmission voltage to thereby prevent a service interruption. On the contrary, the case where a penetrating-shorting fault or a creeping-flashover fault occurs in the current limiting element by a lightning surge exceedingly larger than a designed valve, an arc of high temperature and high pressure is produced inside of the pressure-proof insulating cylinder so that the LSP explodes and flies about.

In order to prevent this, in the LSP of FIG. 3, the organic insulating material over a pressure-release hole is broken through by the arc pressure in the initial stage of a flashover. In the LSP of FIG. 4, on the other hand, the upper and lower pressure-release valves are opened by the arc pressure to discharge an arc jet, and a gas ionized by the arc energy is blown to the outside arcing horns so as to change the course of the arc from the inside of the LSP to the outside to prevent the LSP from exploding and flying about.

FIG. 5A is a diagram illustrating an example of the LSP for a transmission line. FIG. 5A depicts a steel tower 251, an overhead earth wire 252, a transmission line 126, an LSP 124, an insulator 122 and a series gap 127. FIG. 5B is an explanatory diagram showing an example of the application of an LSP, and FIG. 5C is a circuit diagram illustrating an LSP apparatus.

An overhead transmission/distribution line 126 is suspended from a support steel crossarm 121 of a steel tower by a support insulator 122. Arcing horns 123 are attached to the upper and lower ends of the support insulator 122. An LSP 124 is disposed in parallel to the support insulator 122, and a series gap 127 is provided between the lower end portion of the support insulator 122 and the lower end portion of the LSP 124. The distance of the series gap 127 is less than the distance of the arcing horn gap and larger than the maximum arcing distance of the switching surge flashover voltage.

In normal operation of the thus arranged LSP apparatus, if an electric shock 128 is given to the steel tower, the voltage across the support steel crossarm 121 and the transmission/distribution line 126 becomes high suddenly. However, a flashover will occur across the series gap 127 before a flashover between arcing horns 123 so that a lightning surge current flows through the LSP 124. At the transmission voltage after the lightning surge voltage, insulation is recovered by the characteristic of a current limiting element included in the LSP 124 to thereby prevent service interruption.

Thus, in order to make the series gap 127 flashover so quickly that the gap of the arcing horns 123 of the support insulator 122 cannot flashover when a lightning surge voltage $V_1$ is applied, the potential gradient $V_2$(V/cm) across the series gap 127 must be higher than the potential gradient $V_3$(V/cm) across the arcing horns 123. The share voltage ratio of the LSP 124 to the series gap 127 upon application of a lightning surge voltage is determined by the electrostatic capacity ratio of the electrostatic capacity $C_1$ of the LSP 124 to the electrostatic capacity $C_2$ of the series gap 127.

However, in the case of the above-mentioned conventional LSP, the upper and lower electrode members are connected to each other by an insulating material. The electrostatic capacity $C_1$ of the arrester becomes small as seen in the equivalent circuit shown in FIG. 6A, so that the ratio of the electrostatic capacity C1 to the electrostatic capacity C2 of the series gap becomes $\simeq 1$. The potential gradients of $V_2$ and $V_3$ are therefore close to each other, so that there is a possibility that the arcing horns 123 on the support insulator 122 side will flashover. It is therefore necessary to make a change such as enlarging the distance between the arcing horns 123 on the support insulator 122 side. In FIG. 6A, $C_{01}$ to $C_{05}$ represent respective electrostatic capacities of current limiting elements, and $C_{11}$ represents an extremely small electrostatic capacity across the upper and lower electrode members.

Furthermore, since each of the above-mentioned conventional LSPs is constituted by a current limiting element, a pressure-proof insulating cylinder, pressure-release apertures or valves, and an arcing ring or horns, there exist the following problems:

(i) since each LSP is not of an arc-extinguishable structure, generation of arc energy continues even while a shorting current flows, so that there is a potential for fire;

(ii) if pressure-release holes or valves are blocked by broken pieces of the current limiting element or the like, the blow off of an arc jet may be delayed, possibly damaging the pressure-proof insulating cylinder;

(iii) a harmful gas at high temperature and high pressure is produced and exhausted into the air;

(iv) there is a fear that a part of the structure may fly about; causing damage or injury and (v) arcing rings or arcing horns and a pressure-release mechanism are necessary, thus complicating the structure.

SUMMARY OF THE INVENTION

An object of the present invention is to provide an LSP in which the foregoing problems are solved. The LSP of the present invention is characterized by a current limiting element inside a pressure-proof housing composed of a conductive material and coupled with an upper electrode member.

Furthermore, another object of the present invention is to provide a self arc-extinguishing LSP in which the current limiting element and upper and lower electrode members are suspended and fixed in a conductive pressure-proof housing opened at its lower portion through by a suspension structure composed of a suspension rod. The outside and inside of the housing are covered and filled with an insulator, so that, when an internal arc occurs, the lower electrode member breaks the insulator in the vicinity of an opening portion of the conductive pressure-proof housing, with energy due to the arc, so as to electrically connect the conductive pressure-proof housing to a part of the lower electrode member.

BRIEF DESCRIPTION OF THE DRAWINGS

FIGS. 10A and 10B are explanatory diagrams illustrating the operation of a self arc-extinguishing LSP according to the present invention;

DESCRIPTION OF THE PREFERRED EMBODIMENT

Figure 1:
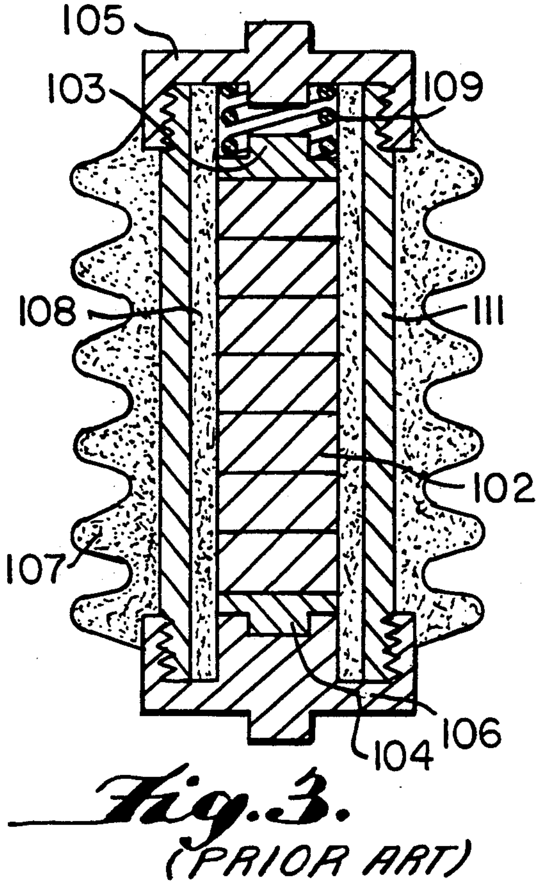
Fig. 1. (PRIOR ART)
FIGS. 1 to 4 are longitudinal sectional views illustrating respective structure examples of conventional LSPs having current limiting elements.
Figure 2:
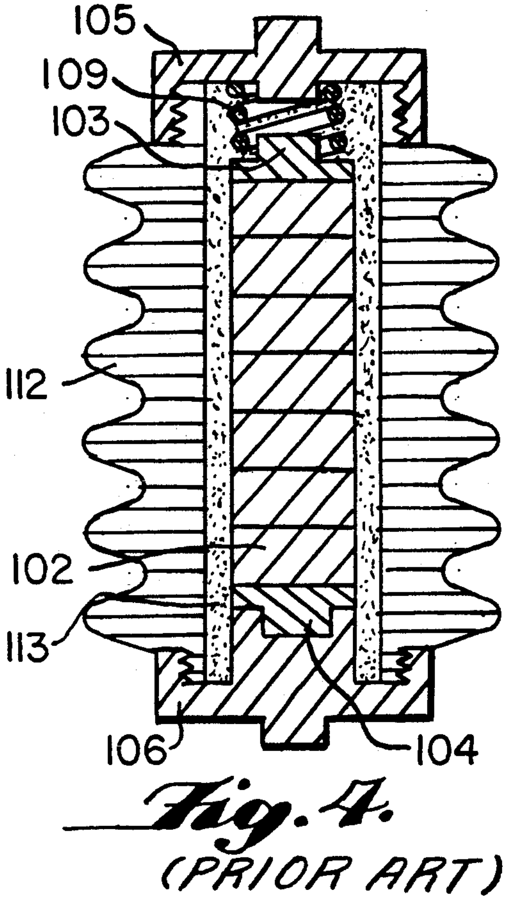
Fig. 2. (PRIOR ART)
Figure 3:
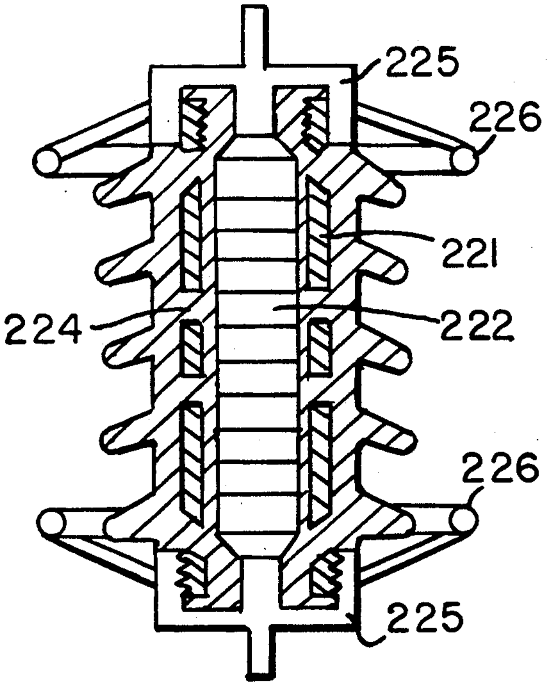
Fig. 3. (PRIOR ART)
Figure 4:
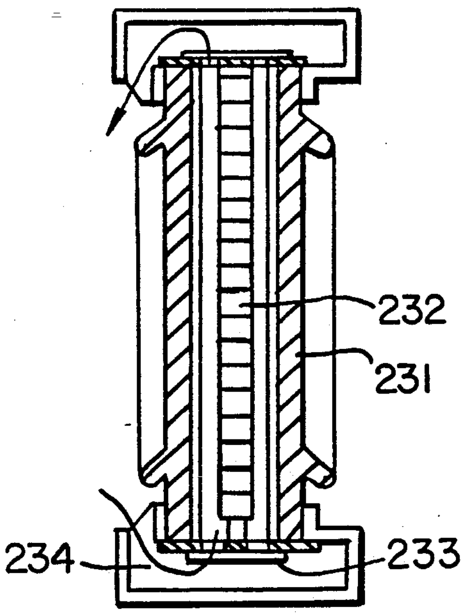
Fig. 4. (PRIOR ART)
Figure 7:
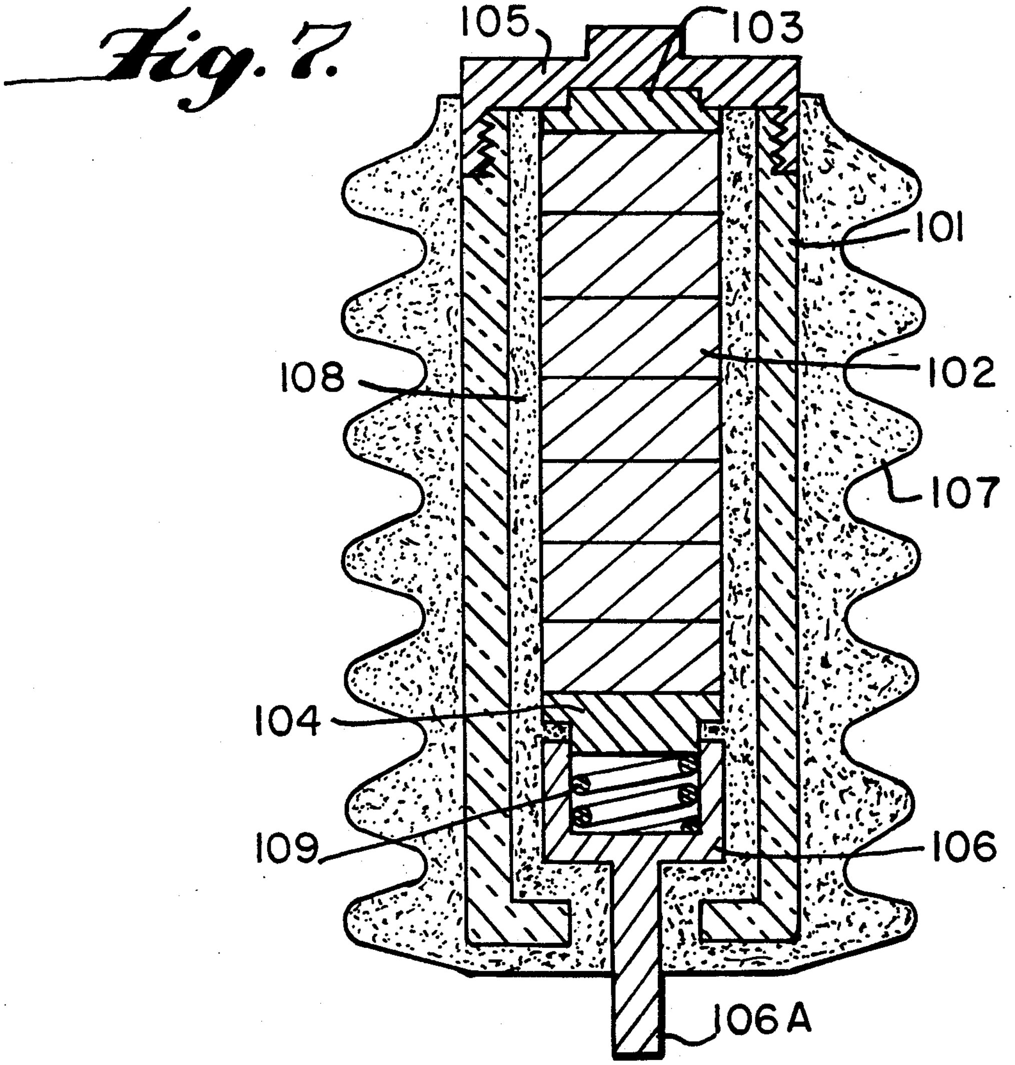
FIG. 7 is a longitudinal sectional view illustrating an LSP according to the first object of the present invention.

FIG. 7 is a longitudinal sectional view illustrating an LSP according to the first object of the present invention. In FIG. 7, parts the same as those in FIG. 1 are referenced correspondingly.

In the LSP according to the first object of the present invention, a cylindrical pressure-proof housing 101 is composed of a conductive material. The upper end of the conductive pressure-proof housing 101 is connected to an upper electrode metal member 105 by screws, and the lower end of the housing is opened partially. In the inner space of the conductive pressure-proof housing 101, a current limiting element 102, an upper electrode plate 103, a lower electrode plate 104, a spring 109 and an upper portion of a lower electrode metal member 106 are housed and fixed. A rod portion 106A of the lower electrode metal member 106 penetrates the lower opening portion of the conductive pressure-proof housing 101 so as to project outside partially. Thus, the conductive pressure-proof housing 101 is made to form a one-side electrode of an electrostatic capacitor including the current limiting element 102 and the lower electrode member.

The outer wall surface of the conductive pressure-proof housing 101 is given an insulating coating 107 of an organic insulator, and the inner space portion of the housing including the lower opening portion is filled with an organic insulator 108.

Figure 5A:
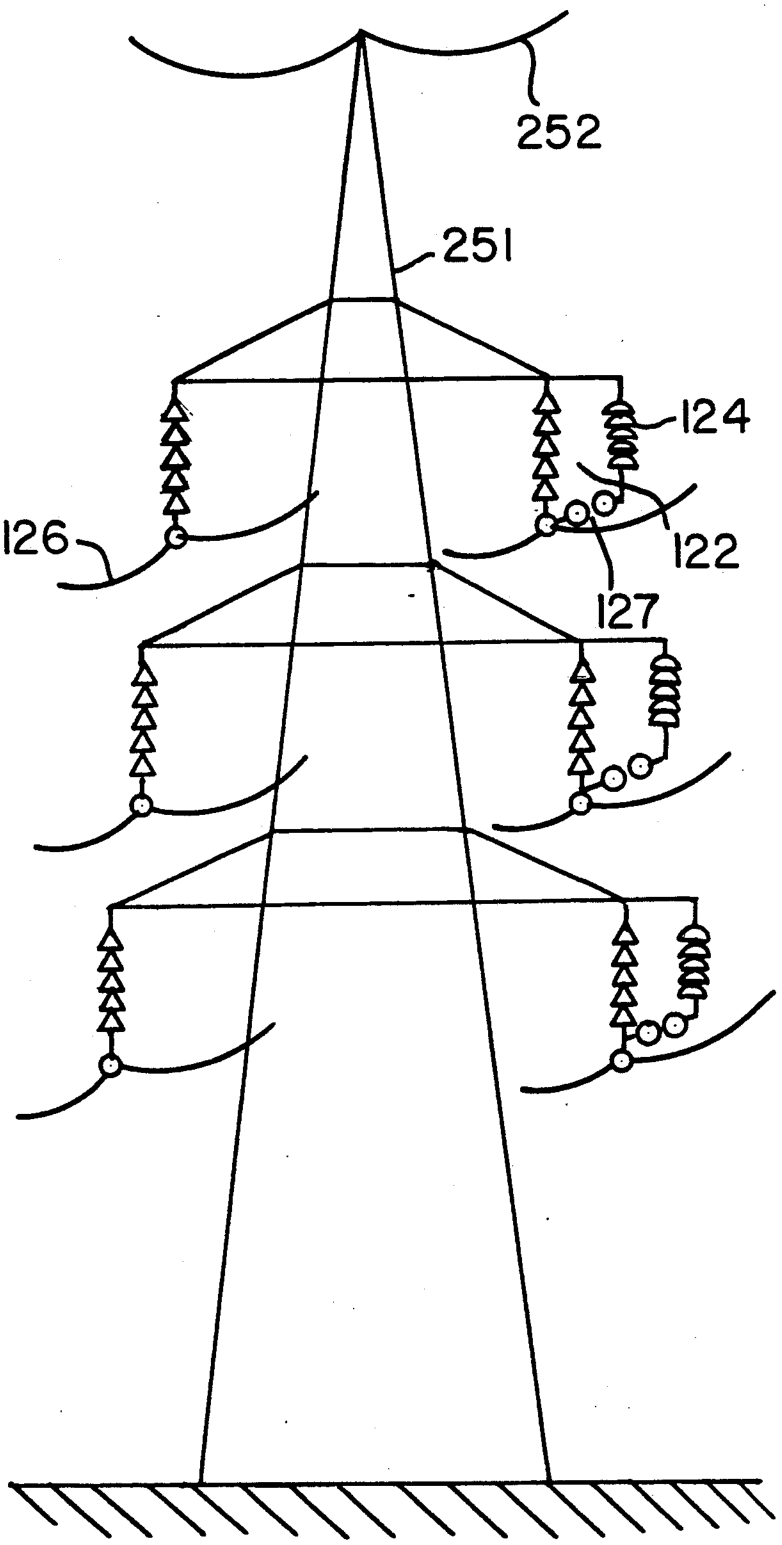
FIG. 5A is a diagram illustrating an application of an LSP to a transmission line.
Figure 5B:
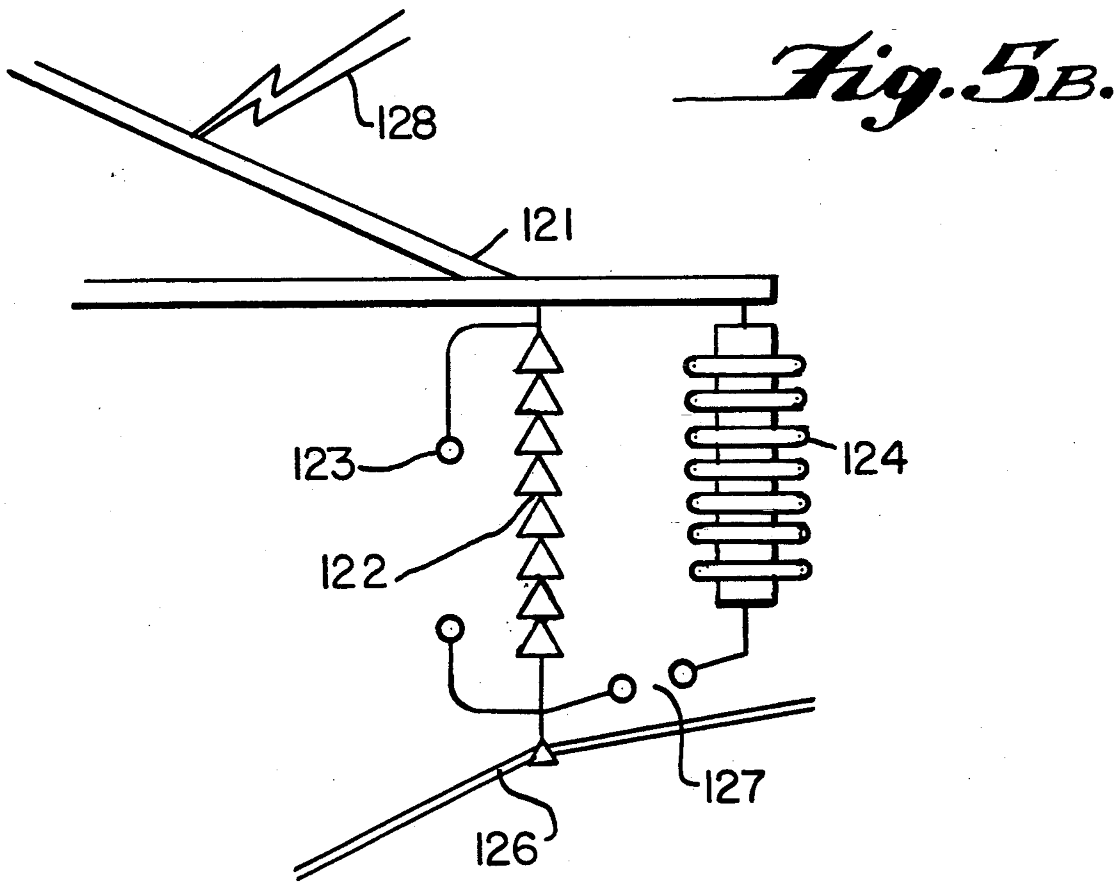
FIG. 5B is an explanatory diagram of a main portion of an arrangement example of an LSP.
Figure 5C:
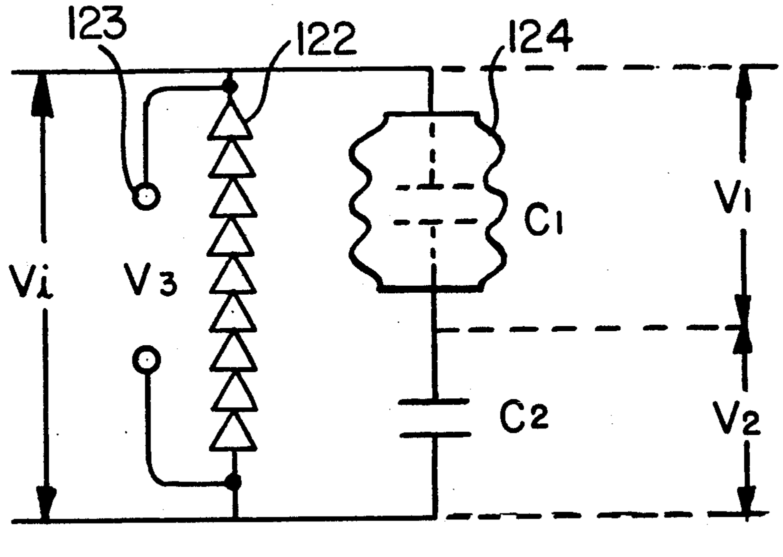
FIG. 5C is a circuit configuration diagram of an LSP apparatus including an LSP.
Figure 6B:
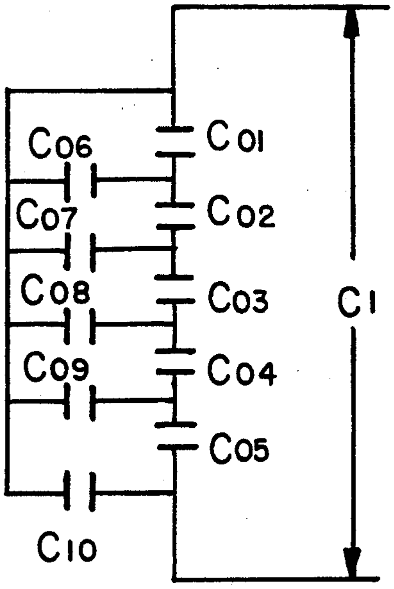
FIGS. 6A and 6B are equivalent circuit diagrams of electrostatic capacities of the conventional LSP and the LSP of the present invention.
Figure 6A:
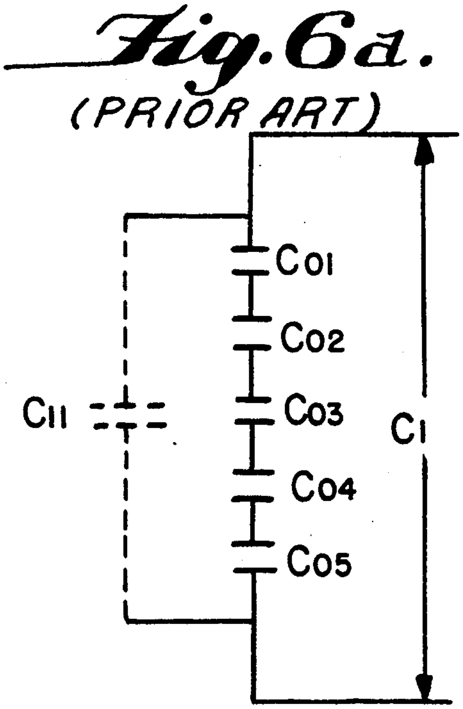
Fig. 6a. (PRIOR ART)

When the above-mentioned LSP according to the present invention is arranged as shown in FIG. 5B, the electrostatic capacity $C_1$ of the LSP 124 shown by the equivalent circuit of FIG. 5C becomes, as shown by the equivalent circuit of FIG. 6B, larger with a larger electrostatic capacity $C_{10}$ across the conductive pressure-proof housing and the lower electrode member to thereby establish the condition of $C_1 >> C_2$. Consequently, when the lightning surge voltage V is applied, the condition of $V_1 \simeq 0$ is satisfied and most of V is applied to the series gap so that it is possible to more surely induce the series gap to flashover. It is therefore not necessary to increase the distance between the arcing horns at the existing support insulator side to induce flashover at the series gap.

Figure 8:
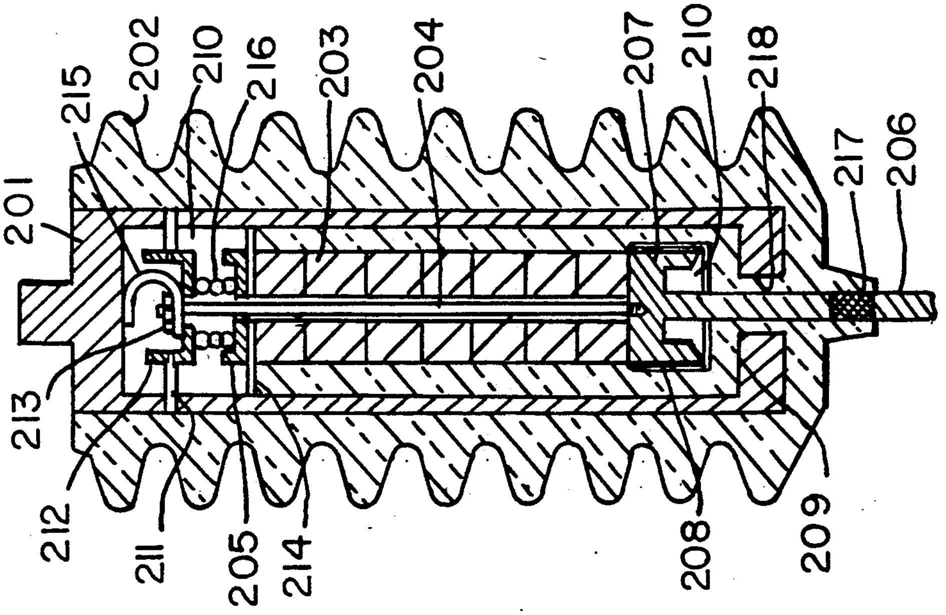

FIG. 8 is a longitudinal sectional view illustrating a self arc-extinguishing LSP according to the second object of the present invention.

In the LSP according to the second object of the present invention, the conventional pressure-proof insulating cylinder is replaced by a conductive pressure-proof housing 201 having in its lower portion an opening portion 218, and containing a current limiting element 203, and upper and lower electrode members. The outside of the above-mentioned conductive pressure-proof housing 201 is covered with an organic insulator 202 and the inside of the housing is also filled with an insulator 202 to thereby insulate the current limiting element 203 and the upper and lower electrode members from the conductive pressure-proof housing 201.

An upper electrode plate 205 is disposed on a thin plate 214 on the upper surface of the current limiting element 203. A lower electrode member constituted integrally by a cutting blade portion 207 and a rod portion 206 is disposed on the lower surface of the current limiting element 203. The electrode rod portion 206 penetrates the insulator 202 in the opening portion 218 of the conductive pressure-proof housing 201 and projects outside partially. The cutting blade 207 of the lower electrode member is covered with a metal cover 208 having a curved surface. In addition, the part of the electrode rod portion 206 of the lower electrode member covered with the insulator 202 is given a coloring 217, so that the downward displacement of the lower electrode member can be detected.

A suspension rod made from an insulating material is provided to penetrate the current limiting element 203 and the upper electrode plate 205. The lower end portion of the suspension rod 204 is located in the cutting blade portion 207, and the upper end portion of the suspension rod 204 is fastened by means of a nut 213 to an upper electrode suspension metal member 212 which is held on the conductive pressure-proof housing 201 by means of a holding pin 211. Thus, the current limiting element 203 and the upper and lower electrode members are housed and fixed in the conductive pressure-proof housing 201 by a suspension structure. A spring 216 is interposed between the upper electrode suspension metal member 212 and the upper electrode plate 205; and the upper electrode suspension metal member 212 and the conductive pressure-proof housing 201 are connected through a conductive bracket 215.

Figure 9:
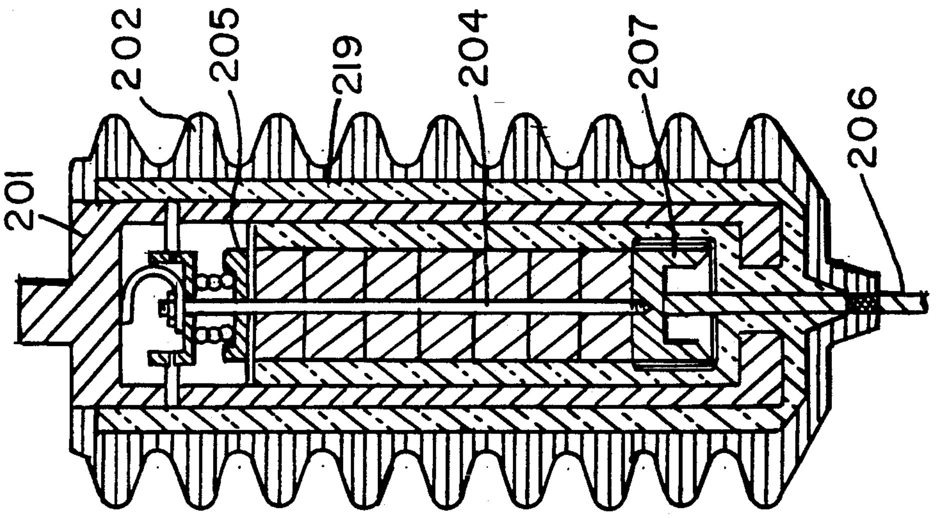
FIGS. 8 and 9 are longitudinal sectional views illustrating self arc-extinguishing LSPs according to the second object of the present invention.

FIG. 9 is a longitudinal sectional view illustrating another embodiment of the self arc-extinguishing LSP according to the present invention. This embodiment differs from that of FIG. 8. The insulator is made to have a double-layer structure. An insulator 219 which has a high insulating property and which is not required to have a weather-proof property is used for filling the inside of the conductive pressure-proof housing 201 and for covering the same. Also an insulator 202 having a superior weather-proof property is used for the outermost layer.

Although a portion 217 of the lower electrode rod portion 206 covered with an insulator is colored in the embodiments in FIGS. 8 and 9, an exposed portion of the same can be marked with coloring, a seal, a stamp or the like to indicate the movement.

FIGS. 1OA and 10B are diagrams for explaining the effect of the self arc-extinguishing LSP according to the present invention, during normal operation and during abnormal operation respectively.

The drawings show a steel tower 241, an insulator 242, a transmission line 243, a current limiting element 244, a conductive pressure-proof housing 245, a series gap 246, an arc in the gap 247, an electric current 248, and the striking of a thunderbolt 249.

During normal operation, at the time of a lightning strike, as shown in FIG. 10A, the lightning surge current 248 flows from the lower electrode portion through the current limiting element 244 to the steel tower 241, so that a current from the transmission line 243, after the lightning surge current, flows in the same course, but is limited by the current limiting element 244.

However, if the current limiting element is broken or subjected to a creeping-flashover because of an exceedingly strong lightning surge current over a designed value, a sudden thermal expansion pressure caused by an arc is produced in the LSP shown in FIG. 8. A part of this thermal expansion, pressure concentrates in a gas layer 210 of the upper electrode portion and acts in the direction to press downward upon the members housed in the conductive pressure-proof housing 201 such as the current limiting element 203 and so on, so that the holding pin 211 breaks off and the cutting blade portion 207 of the lower electrode member punctures through the conductive cover 208 and the insulator 202, and reaches a blade receiving portion 209 of the conductive pressure-proof housing 201 as shown in the lower portion of FIG. 11A. Thereby electrically connecting the conductive pressure-proof housing 201 to the lower electrode member. As a result, as shown in FIG. 10B, the course of the current 248 is changed to flow from the lower electrode portion through the inside of the conductive pressure-proof housing 245 to the steel tower 241, so that the internal arc disappears and the high internal pressure is limited to prevent the arrester from exploding and flying about. At the same time, the colored portion 217 of the lower electrode rod portion 206 is exposed from the insulator 202 to indicate that the current limiting element is broken off by an exceedingly strong lightning surge or the like.

Figure 11A:
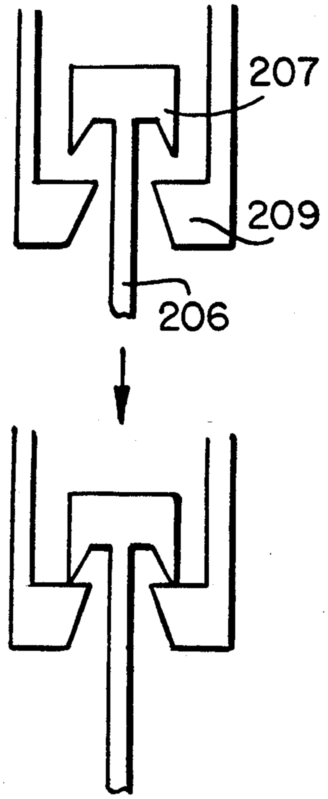
FIGS. 11A to 11C are explanatory diagrams illustrating respective connection mechanism of a conductive pressure-proof housing and a lower electrode member.
Figure 11B:
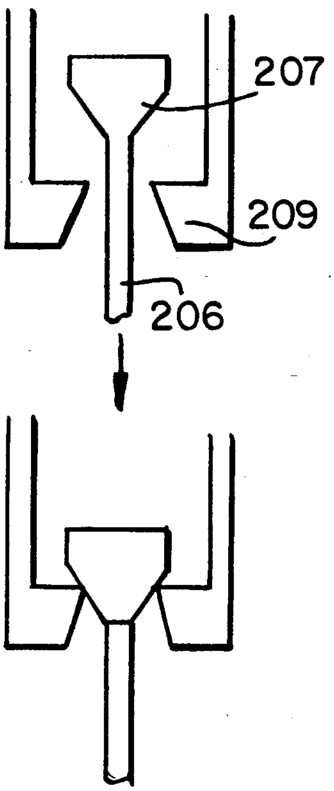
Figure 11C:
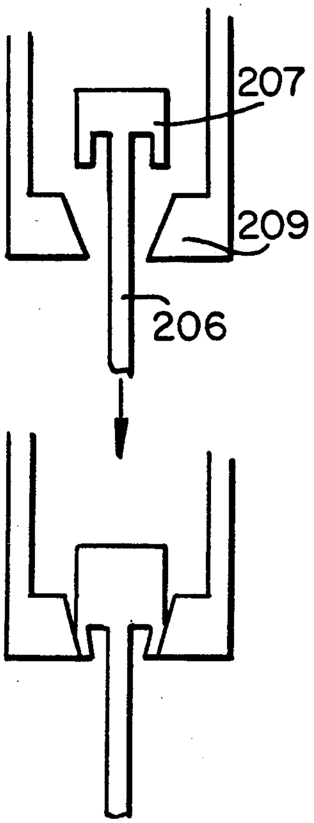
Figure 12A:
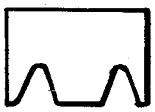
FIG. 12 shows diagrams illustrating shapes of a connection portion of the lower electrode member.
Figure 12B:
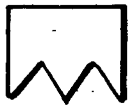
Figure 12C:
Figure 12D:
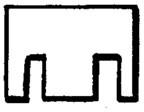
Figure 12E:
Figure 12F:
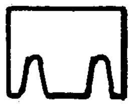
Figure 12G:
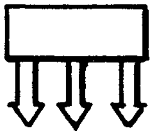
Figure 12H:
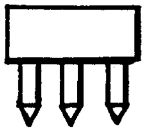

FIG. 11A is a diagram illustrating the state of connection between the cutting blade portion 207 of the lower electrode member and the blade receiving portion 209 of the conductive pressure-proof housing 201. However, the present invention is not limited to this. The cutting blade may be formed to a conical shape 207 and pressed out to the gap of the receiving portion 209 as shown in FIG. 11B, or slits may be provided to make the cutting blade portion 207 transformable so that the cutting blade portion 207 can be pinched by the receiving portion 209 as shown in FIG. 11C.

In FIG. 12, parts (a) to (h) are diagrams illustrating various examples of shapes of the cutting blade portion of the lower electrode member.

As has been described, in the LSP according to the present invention, since the electrostatic capacity of the LSP is increased by using a conductive material as a pressure-proof housing, flashover due to a lightning surge at a series gap is more ensured. It is therefore not necessary to perform a countermeasure such as increasing the distance between the arcing horns at the existing insulator side, so that both the reliability and economy are improved, and the LSP has increased utility when used as an LSP for a power transmission/distribution line and equipment.

Furthermore, in the self arc-extinguishing LSP according to the present invention, since a pressure-proof housing is composed of a conductive material and is electrically connected with the lower electrode member during abnormally high surges so as to extinguish an arc, it is possible to prevent the LSP from exploding and flying about. This feature provides an extremely effective, and safe LSP for use in transmission lines, power transmission equipment, distribution equipment and so on.

What is claimed is:

1. A Lightning Surge Protector for protecting equipment from a lightning surge, comprising:

a voltage-current non-linear resistor element;

an upper electrode member;

a lower electrode member; and a cylindrical pressure-proof housing coupled to said upper electrode member and being composed of a conductive material for accommodating said resistor element and said upper and lower electrode members, said pressure-proof housing having an outer wall surface covered with an organic insulator and an interior space filled with said organic insulator.

2. A lightning surge protector for protecting equipment from a lightning surge, comprising:

a voltage-current non-linear resistor element for limiting a current caused by said lightning surge; and a conductive pressure-proof housing for accommodating said resistor element and a lower electrode member, said housing having an outer wall surface covered with an organic insulator and an interior space filled with said organic insulator, wherein said conductive pressure-proof housing comprises:

an upper end connected to an upper electrode member; and a lower partially opened end.

3. A lightning surge protector for protecting equipment from a lightning surge, comprising:

a voltage-current non-linear resistor element for limiting a current caused by said lightning surge; and a conductive pressure-proof housing for accommodating said resistor element and a lower electrode member, said housing having an outer wall surface covered with an organic insulator and an interior space filed with said organic insulator, wherein said conductive pressure-proof housing comprises an upper end connected to an upper electrode member, and a lower partially opened end, wherein said upper electrode member comprises:

an upper electrode plate;

a spring; and an upper electrode, said upper electrode plate being disposed between said upper electrode and said voltage-current non-linear resistor element; and wherein said lower electrode member comprises:

a lower electrode plate; and a lower electrode having a lower rod portion which penetrates and projects outside said lower opening of said conductive pressure-proof housing.

4. A self arc-extinguishing lightning surge protector for protecting equipment from a lightning surge, comprising:

a non-linear resistive current limiting element for limiting a current caused by a lightning surge; and a conductive pressure-proof housing for accommodating said voltage-current non-linear resistor element comprising:

an upper electrode member;

a lower electrode member;

a lower end of the housing having a partial opening portion;

an outer insulating element covering an exterior wall surface of said housing; and an outer insulating element filling an interior space of said housing to insulate the housing from the resistor element;

such that when an internal arc occurs, the energy from the lightning causes the lower electrode member to break said insulator at the opening portion of said conductive pressure-proof housing so as to electrically connect said conductive pressure-proof housing to a part of said lower electrode member.

5. A self arc-extinguishing lightning surge protector for protecting equipment from a lightning surge, comprising:

a non-linear resistive current limiting element for limiting a current caused by said lightning surge; and a conductive pressure-proof housing for accommodating said non-linear resistive current limiting element comprising:

an upper electrode member;

a lower electrode member;

a lower end of the housing having a partial opening portion;

an outer insulating element covering an exterior wall surface of said housing; and an inner insulating element filling an interior space of said housing to insulate said housing from said resistor element;

such that when an internal arc occurs, the energy from said lightning causes said lower electrode member to break said insulator at said opening portion of said conductive pressure-proof housing so as to electrically connect said conductive pressure-proof housing to a part of said lower electrode member, wherein said lower electrode member has a blade portion and a projecting portion for breaking said insulator so as to electrically connect said conductive pressure-proof housing to said lower electrode member.

6. A self arc-extinguishing lightning surge protector for protecting equipment from a lightning surge, comprising:

a non-linear resistive current limiting element for limiting a current caused by said lightning surge; and a conductive pressure-proof housing for accommodating said voltage-current non-linear resistor element comprising:

an upper electrode member;

a lower electrode member;

a lower end of said housing having a partial opening portion;

an outer insulating element covering an exterior wall surface of said housing; and an inner insulating element filling an interior space of said housing to insulate said housing from said resistor element;

such that when an internal arc occurs, the energy from said lightning causes said lower electrode member to break said insulator at said opening portion of said conductive pressure-proof housing so as to electrically connect said conductive pressure-proof housing to a part of said lower electrode member, wherein said conductive pressure-proof housing has a blade portion and a projecting portion for breaking said insulator so as to electrically connect said conductive pressure-proof housing to said lower electrode member.

7. A self arc-extinguishing lightning surge protector according to claim 5 or 6, wherein said blade and said projecting portion are covered with a metal cover or a conductive member having a curved surface.

8. A self arc-extinguishing arrester for protecting equipment from a lightning surge comprising:

a non-linear resistive current limiting element for limiting a current caused by said lightning surge; and a conductive pressure-proof housing for accommodating said non-linear resistive current limiting element comprising:

an upper electrode member;

a lower electrode member;

a lower end of said housing having a partial opening portion;

an outer insulating element covering an exterior wall surface of said housing; and an inner insulating element filling an interior space of said housing to insulate said housing from said resistor element;

such that when an internal arc occurs, the energy from said lightning causes said lower electrode member to break said insulator at said opening portion of said conductive pressure-proof housing so as to electrically connect said conductive pressure-proof housing to a part of said lower electrode member, wherein said lower electrode member has a rod-like portion comprising:

a covered portion covered with said insulator element and being painted to be brightly visible; and a projecting portion projecting outside said housing, such that it is possible to visually distinguish a displacement of said lower electrode member.

* * * * *